US010032322B2

(12) United States Patent
Lacaille (10) Patent No.: US 10,032,322 B2
(45) Date of Patent: Jul. 24, 2018

(54) VALIDATION TOOL FOR AN AIRCRAFT ENGINE MONITORING SYSTEM

(71) Applicant: Safran Aircraft Engines, Paris (FR)

(72) Inventor: Jérôme Henri Noël Lacaille, Rosney sous Bois (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/524,778

(22) PCT Filed: Oct. 28, 2015

(86) PCT No.: PCT/FR2015/052905
§ 371 (c)(1),
(2) Date: May 5, 2017

(87) PCT Pub. No.: WO2016/071605
PCT Pub. Date: May 12, 2016

(65) Prior Publication Data
US 2017/0352205 A1    Dec. 7, 2017

(30) Foreign Application Priority Data

Nov. 5, 2014   (FR) ...................................... 14 60668

(51) Int. Cl.
*G01M 17/00*   (2006.01)
*G07C 5/08*    (2006.01)
(Continued)

(52) U.S. Cl.
CPC .............. *G07C 5/0816* (2013.01); *B64F 5/60* (2017.01); *F01D 17/02* (2013.01); *F01D 21/003* (2013.01); *B64D 45/00* (2013.01)

(58) Field of Classification Search
CPC .......... G07C 5/0816; B64F 5/60; F01D 17/02
See application file for complete search history.

(56) References Cited

U.S. PATENT DOCUMENTS 5,629,626 A *  5/1997  Russell ................... G01V 3/08
                                                     324/226
9,799,229 B2 * 10/2017  Wokurka ............... G09B 9/003
(Continued)

FOREIGN PATENT DOCUMENTS

FR      2 957 170 A1     9/2011
WO    2013/171427 A1    11/2013

OTHER PUBLICATIONS

Search Report and Opinion issued in French Patent Application No. 1460668 dated Jun. 24, 2015.
(Continued)

*Primary Examiner* — Adam M Alharbi
(74) *Attorney, Agent, or Firm* — Pearne & Gordon LLP (57) ABSTRACT

A tool for validation of a system for monitoring at least one piece of equipment in an aircraft engine, also comprising a computer configured to: collect observation data related to the equipment, calculate a current value of at least one quality indicator on a current quantity of observation data, estimate the probability that the current value of the quality indicator reaches a predetermined reliability criterion, thus forming a probabilistic reliability law, and estimate a minimum quantity of observation data from the probabilistic reliability law, starting from which the value of the quality indicator reaches a predetermined reliability criterion with a probability exceeding a predetermined value.

10 Claims, 5 Drawing Sheets

(51) Int. Cl.
  *B64F 5/60* (2017.01)
  *F01D 21/00* (2006.01)
  *F01D 17/02* (2006.01)
  *B64D 45/00* (2006.01)

(56) References Cited

U.S. PATENT DOCUMENTS

2013/0211768 A1    8/2013   Gerez
2015/0120214 A1    4/2015   Gouby
2016/0240017 A1    8/2016   Lacaille
2016/0358387 A1   12/2016   Lacaille

OTHER PUBLICATIONS

International Search Report issued in Application No. PCT/FR2015/052905 dated Mar. 1, 2016.
Written Opinion issued in Application No. PCT/FR2015/052905 dated Mar. 1, 2016.
U.S. Appl. No. 15/388,185, "Aircraft Flight Data Evaluation System" filed on Dec. 22, 2016.

* cited by examiner

VALIDATION TOOL FOR AN AIRCRAFT ENGINE MONITORING SYSTEM

TECHNICAL DOMAIN

This invention relates to the domain of aircraft engine monitoring systems and most particularly, a tool for validation of a system for monitoring equipment of the aircraft engine.

STATE OF PRIOR ART

Monitoring systems are used to check that the various equipment of the aircraft engine is functioning correctly. For example, there is one monitoring system to analyse the behaviour of the engine during the ignition process, another system to analyse the gas trajectory, yet another system to detect clogging of filters, and another system to analyse oil consumption, etc.

All these monitoring systems combined are sufficient to improve the safety and reliability of aircraft engines. In particular, they make it possible to avoid or limit in-flight shutdowns, reduce delays or cancellations of flights, and more particularly facilitate engine maintenance by anticipating failures and identifying faulty or defective components.

At the present time, there is a tool for the design of a monitoring system based on indicators that are compared with thresholds defined by specifications. This tool is described in French patent application FR2957170 deposited by the Applicant.

Validation of a monitoring system requires that tests should be carried out for example on a test bench to collect a large number of data. A lot of resources and time then have to be set aside to perform these tests, and furthermore, the large number of collected data can require a long calculation time.

It is also possible that the validation level of one monitoring system is different from the validation level of another monitoring system. This can make it more complicated to analyse data output from different engine monitoring systems.

The purpose of this invention is to disclose a tool for validation of a system for monitoring equipment in an aircraft engine capable of optimising the quantity of data necessary for validation, thus reducing development costs and times while improving the reliability of the monitoring system.

PRESENTATION OF THE INVENTION

This invention is defined by a tool for validation of a system for monitoring at least one piece of equipment in an aircraft engine, comprising:
  processing means configured to collect observation data related to said equipment,
  analysis means configured to calculate a current value of at least one quality indicator on a current quantity of observation data collected by the processing means.
  analysis means configured to estimate the probability that said current value of the quality indicator reaches a predetermined reliability criterion, thus forming a probabilistic reliability law estimated on a set of values of the quality indicator applicable to a corresponding set of quantities of observation data, and
  analysis means configured to estimate a minimum quantity of observation data from said probabilistic reliability law, starting from which the value of the quality indicator reaches a predetermined reliability criterion with a probability exceeding a predetermined value,
  test means configured to evaluate a validation of said monitoring system by applying a set of quality indicators to said minimum quantity of observation data related to said equipment.

This makes it possible to know when to stop collecting data to evaluate the monitoring system and therefore to reduce the costs of tests.

Advantageously, said predetermined value is the complement of an error predefined as being acceptable.

Advantageously, the analysis means are configured to calculate the current value of a quality indicator by applying a cross-validation technique on said current quantity of observation data. Said cross validation technique may be selected from among the following techniques: bootstrap, K-fold, leave-one-out.

Advantageously, the set of quality indicators includes the following indicators: false alarm ratio, detection ratio, localisation ratio.

Advantageously, the analysis means are configured to apply a regression technique on said set of quality indicator values to determine an approximation function representative of said probabilistic reliability law as a function of the quantity of observation data.

According to one special feature of this invention, for a quality indicator corresponding to the probability of false alarm, said approximation function as a function of the quantity n of observation data is expressed by the following relation:

$$f(n) = a + \frac{b}{\sqrt{n}} + c \log(n)$$

in which a, b, c are regression constants.

Advantageously, the test means are configured to evaluate a validation of said monitoring system before its installation on an aircraft by applying the set of quality indicators on a quantity of observation data collected on a test bench and/or a fleet of aircraft engines in operation. This makes it possible to validate a generic monitoring system adapted to monitor a series engine.

Advantageously, the test means are configured to continue validation and adjustment of said monitoring system after its installation on a series engine by applying the set of quality indicators on a quantity of observation data collected in flight. This means that the monitoring system can be specialised so that it is adapted to the specific use of the engine on which it is installed, that can depend on the mission, trajectory, maintenance, etc.

The invention also aims at a system for monitoring at least one aircraft engine equipment designed by the design tool according to any one of the above characteristics, said system being configured to receive observation data specific to said equipment and to deliver a result containing a diagnostic of the state of said equipment.

The invention also relates to a method of validating a system for monitoring at least one item of aircraft engine equipment, comprising test steps to evaluate a validation of said monitoring system by applying a set of quality indicators to a volume of observation data related to said equipment, said method also comprising the following steps:

collect observation data related to said equipment, calculate a current value of at least one quality indicator on a current quantity of observation data collected by the processing means, estimate the probability that said current value of the quality indicator reaches a predetermined reliability criterion, thus forming a probabilistic reliability law estimated on a set of values of the quality indicator applicable to a corresponding set of quantities of observation data, and estimate a minimum quantity of observation data from said probabilistic reliability law, starting from which the value of the quality indicator reaches a predetermined reliability criterion with a probability exceeding a predetermined value, said minimum quantity of observation data corresponding to said volume of observation data that will be used to evaluate the validation of said monitoring equipment.

BRIEF DESCRIPTION OF THE DRAWINGS

Other special features and advantages of the tool and the method according to the invention will be better understood after reading the description given below, for information without being limitative, with reference to the appended drawings on which.

DETAILED PRESENTATION OF PREFERRED EMBODIMENTS

This invention discloses the use of a tool for estimating and anticipating the quantity of data necessary to validate a monitoring system.

Figure 1:
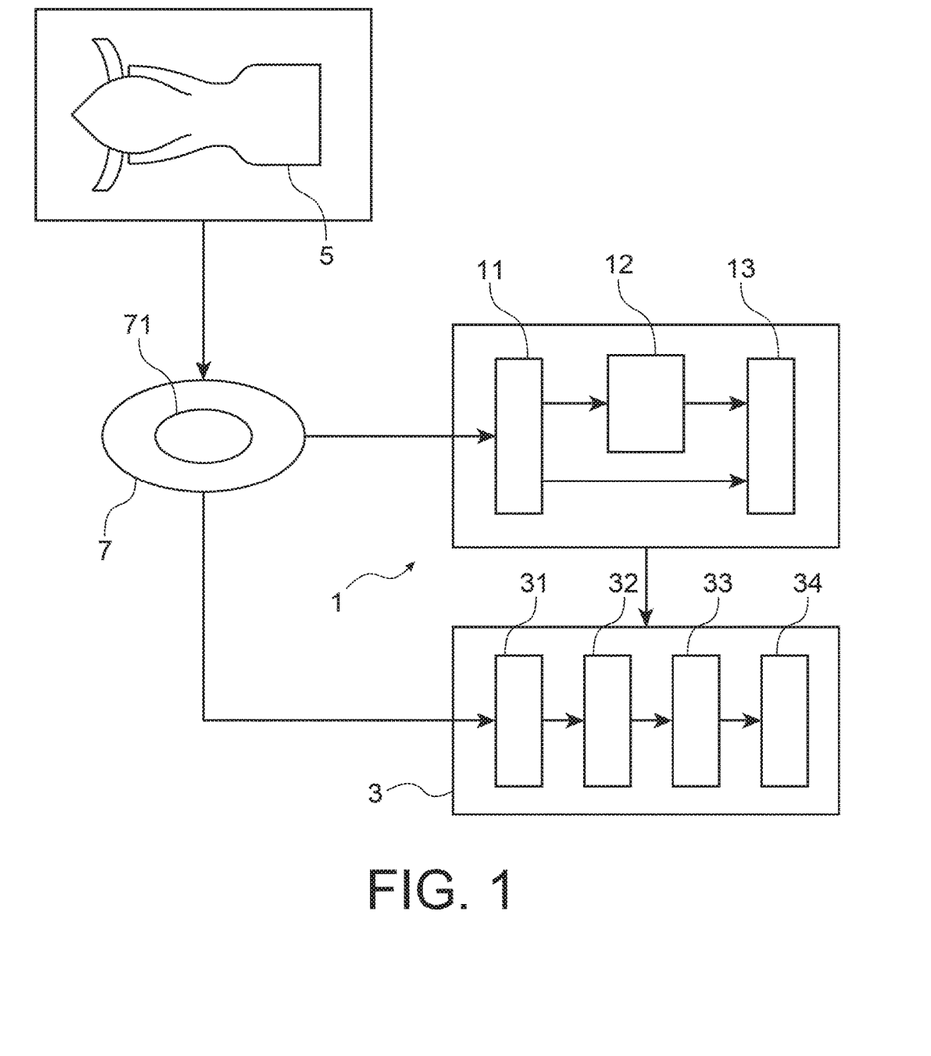
FIG. 1 diagrammatically illustrates a tool for validation of a system for monitoring equipment on an aircraft engine, according to one embodiment of the invention.

FIG. 1 diagrammatically illustrates a tool 1 for validation of a system 3 for monitoring equipment on an aircraft engine 5, according to a first preferred embodiment of the invention.

The monitoring system 3 may be composed of modules 31-34 and each module performs a specific task using a specific algorithm. Such a monitoring system is disclosed in patent application FR2957170 in the name of the applicant and it may comprise a data acquisition module 31, a normalisation module 32, an anomaly diagnostic or detection module 33, a classification module 34 to identify defects, etc.

In execution, the data acquisition module 31 is configured to receive specific measurements or data 71 acquired by sensors on the aircraft engine 5 or by an onboard computer and to output specific data or variables giving information about physical or logical elements of the equipment on the engine 5. These data 71 are extracted from unprocessed temporal measurements (temperatures, pressures, fuel flow, shaft rotations, etc.).

For example, specific data can correspond to the time necessary for an engine shaft to reach the maximum acceleration after each engine start up, the gradient of engine exhaust gas temperatures, the ignition time, the valve opening time, the speed trend, etc.

The normalisation module 32 is configured to receive specific data from the acquisition module 31 to normalise these specific data and to output standardised data independent of the context.

Starting from these standardised data, the objective now is to make a diagnostic of an anomaly and then to deduce a specific failure and possibly the physical component concerned.

Thus, the anomaly detection module 33 is configured to receive standardised data from the normalisation module 32 to construct a signature representative of the behaviour of the engine 5 and to create a diagnostic if its signature reveals an anomaly. The anomaly detection module 33 is also configured to output a score representative of the signature. Depending on the value of the score in comparison with a predefined threshold, the detection module 33 is configured to generate or not generate an alarm indicating that an anomaly has been detected.

The classification module 34 is configured to output a failure identification measure. After having identified failures for example by calculating a probability of occurrence for each failure, the monitoring system 3 can use this probability of occurrence to detect defective components.

Thus, depending on the application type, the monitoring system 3 is configured to perform several tasks that may include data acquisition, normalisation of data, detection of anomalies and possibly the classification of detected anomalies.

However, a qualification or validation phase must be performed on the monitoring system before it can be put into operation.

Therefore the validation tool is used to verify validation of the monitoring system. According to the invention, the validation tool 1 comprises processing means 11, analysis means 12 and test means 13. These means 11-13 are used by devices that are usually located in a computer; a central processing and calculation unit, storage means, input peripherals and output peripherals.

The processing means 11 are configured to collect observation data 7 related to the equipment on the engine 5 to be monitored, These observation data 7 include specific measurements 71 acquired by sensors on the aircraft engine 5 or by an onboard computer and that will be used by the monitoring system 3 to detect defects or anomalies. Moreover, the observation data 7 can also include data derived from tests made on a test bench or records made an operational engine or possibly from simulation data.

Furthermore, the test means 13 are configured to evaluate the validation of the monitoring system by applying a set of quality indicators (Key Performance Indicators—KPI) on a volume of observation data 7 related to this equipment.

More particularly, the test means 13 apply one or several quality indicators KPI on the result of the monitoring system 3 to verify the detection of defects. This results in a mark that can be used to validate the monitoring system 3 on the volume of observation data 7.

Advantageously, the set of KPI quality indicators comprises a measurement of a POD (Probability Of Detection), a PFA (Probability of False Alarm), a measurement of the PCL (Probability of Class Localisation), etc. It will be noted that each quality indicator can be used independently or in combination with other indicators depending on the type of the monitoring system 3.

The Probability Of Detection POD, also called the detection power, is the probability of detecting a defect that is genuinely present in the monitored equipment. It can be estimated as the ratio of the number of detected defects to the total number of defects. Thus, the Probability Of Detection POD can be used to validate the result of the monitoring system 3 with very good reliability.

The Probability of False Alarm PFA is defined as being the probability that the monitored equipment is sound although the monitoring system 3 detected a defect. The Probability of False Alarm PFA can be calculated using Bayesian rules. Let P(detected) be the marginal probability that the monitoring system 3 detects an anomaly, and let P(sound) be the marginal probability that the equipment is sound. Thus, the Probability of False Alarm PFA is the probability that the equipment is sound after a defect was detected.

The Probability of False Alarm PFA is a very important criterion in the aeronautical domain. The case in which the equipment is sound when the monitoring system 3 detects a defect is a phenomenon that must be limited because it can permanently tarnish the user's image of the credibility of the monitoring system 3. Thus, it is very advantageous if the Probability of False Alarm PFA is low.

The data quality indicator is a measurement of the Probability of Class Localisation (PCL) defined as being the probability that the localisation is right when an anomaly of the equipment is observed.

The Probability of Class Localisation PCL is classification quality information, that makes it possible to validate the monitoring system 3 very efficiently. This makes it possible to localise the precise element (for example, alternator, cable, harness, etc.) of the equipment in which there is an anomaly.

In general, the Probability Of Detection POD helps to detect if the equipment comprises an abnormal element, and then the Probability of Class Localisation PCL indicates the efficiency with which this element can be located or identified.

At least part of the set of quality indicators is applied to the observation data 7 collected by the processing means 11 to validate the monitoring system 3.

However, the precision of quality indicators depends on the quantity of observation data 7. Thus, it is advantageous to know the number of observation data 7 necessary before the predetermined quality requirements are satisfied by these indicators.

Figure 2:
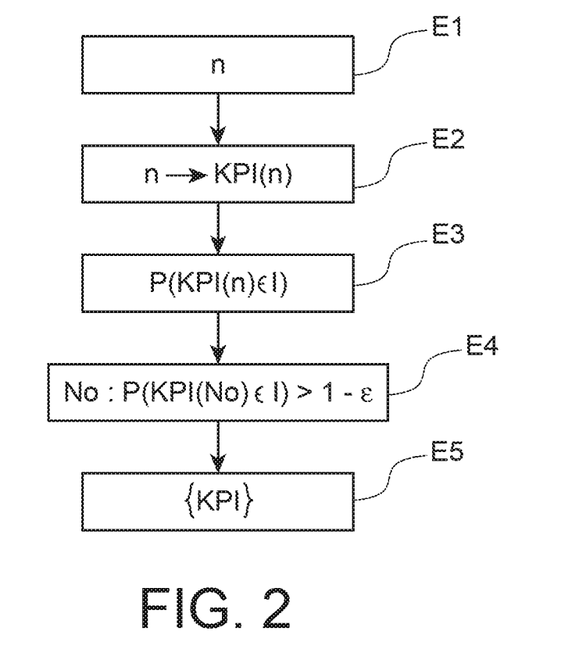
FIG. 2 is a flow chart illustrating a method of determining a minimum number of data for observation and validation of a system for monitoring at least one item of equipment on an aircraft engine, according to one embodiment of the invention.

FIG. 2 is a flow chart illustrating a method of determining a minimum amount of data for observation and validation of a system for monitoring at least one item of equipment on an aircraft engine, according to the invention.

Step E1 relates to the collection of a current quantity of observation data by the processing means 11.

In step E2, the analysis means are configured to calculate a current value of at least one quality indicator for each current quantity (or current number) of observation data 7 collected by the processing means 11.

In other words, for each current number of observation data 7, the analysis means 12 calculate the current value KPI(n) of a quality indicator KPI.

Advantageously, the current value KPI(n) of a quality indicator is calculated by applying a cross-validation technique on the current quantity n of observation data 7.

The cross validation technique can be one of the following techniques: "bootstrap", "K-fold", and "leave-one-out". It consists of generating new data sets derived from the principal set with current size n. For each data set, the analysis means 12 are configured to make an experiment and to calculate a corresponding value of KPI.

More particularly, the "bootstrap" consists of drawing and submitting n observations for the calibration and calculating the KPI on the initial set.

The "K-fold" consists of creating calibration data sets by selecting a predetermined portion of observation data and testing on the remainder. This operation is repeated K times.

The "leave-one-out" calibrates the application on n–1 observation data and tests it on the last one, and n elementary results are obtained.

Cross validation can thus generate a population of values $X_i$=KPI(n|experience i) obtained for each experiment. This population of values $(X_i)_{i=1 \ldots K}$ gives an empirical representation of the current value KPI(n).

In step E3, the analysis means 12 are configured to estimate a probability $P(KPI(n) \in I) = P(n)$ defined as being the probability that the current value KPI(n) of the KPI quality indicator reaches a predetermined reliability criterion, corresponding to a predetermined interval I.

Thus, the analysis means 12 iteratively (i.e., for $n = N_i, \ldots, N_m$), form a probabilistic reliability law P(n) estimated on a set of calculated current values of random variables $KPI(N_i), \ldots, KPI(N_m)$ of the quality indicator for a corresponding set of current quantities $N_i, \ldots, N_m$ of observation data 7.

Advantageously, the analysis means 12 are configured to apply a regression technique on the set of values of quality indicator variables $KPI(N_i), \ldots, KPI(N_m)$ to determine an empirical function representative of the probabilistic reliability law P(n) as a function of the quantity of observation data.

Furthermore, in step E4 the analysis means 12 are configured to start from the probabilistic reliability law P(n) and estimate a minimum quantity $N_0$ (i.e. a minimum number) of observation data starting from which the value of the quality indicator $KPI(n)_{n \geq N_0}$ reaches a predetermined reliability criterion with a probability $P(KPI(n)_{n \geq N_0} \in I)$ higher than a predetermined value $1-\varepsilon$, the predetermined value $1-\varepsilon$ being the complement of an acceptable error $\varepsilon$. In other words, the analysis means 12 search for the first $N_0$ such that $P(KPI(N_0) \in) > 1-\varepsilon$.

For example, for the POD detection rate, a search is made for the first $N_0$ that satisfies the following relation:

$$P(POD(N_0) > 1-\beta) > 1-\varepsilon$$

Furthermore, for the Probability of False Alarm (PFA), a search is made for the first $N_0$ that satisfies the following relation:

$$P(PFA(N_0) < \alpha) > 1-\varepsilon$$

$1-\beta$ and $\alpha$ represent the reliability requirements for POD and PFA respectively.

In order to estimate the minimum quantity $N_0$, the analysis means 12 are advantageously configured to construct a probabilistic reliability law P(n) for $n = N_i, \ldots, N_m$. This curve is then extrapolated until it crosses the ordinates axis at the predetermined value $1-\varepsilon$. This will give an estimate of the required minimum number $N_0$ of observation data 7 on the abscissa.

As a variant, in order to determine the first $N_0$ necessary to reach the objective, an error curve $\varepsilon(n)$ can be constructed representing the complement $1-P(n)$ of the law $P(n)$ and the curve can be extrapolated until it crosses the ordinates axis at the value of the acceptable error $\varepsilon$.

It will be noted that for the Probability of False Alarm PFA, the probabilistic reliability law $P(n)$ is an average of n Boolean experiments of the parameter p representing the real value of PFA. Therefore its law is a law of a Binomial divided by n, it converges towards a normal law with average p and variance $\sigma_n = p(1-p)/n$ with the following shape:

$$P(n) = \frac{1}{\sqrt{2\pi}} \int_{-\infty}^{(\alpha-p)/\sigma_n} e^{-\frac{x^2}{2}} dx = \frac{1}{2}\left(1 + \text{erf}\frac{\alpha-p}{\sqrt{2}\,\sigma_n}\right)$$

Advantageously, assumptions about how the theoretical law $P(n)$ changes are made to simplify the method of estimating it. For example, when $\alpha$ is less than p, the theoretical law $P(n)$ converges exponentially towards zero.

Thus, for the Probability of False Alarm PFA, the theoretical reliability law $P(n)$ can be represented by an approximation function $f(n)$ with the following shape:

$$f(n) = a + \frac{b}{\sqrt{n}} + c \log(n)$$

in which a, b, c are constants that can be determined by a regression technique on all values $PFA(N_i), \ldots, PFA(N_m)$ of the Probability of False Alarm PFA. It will be noted that the term in $\log(n)$ is used to correct the decay in $$\frac{1}{\sqrt{n}}$$

or the approximation function $f(n)$ thus reducing the approximation error to obtain an estimate better conforming with the theoretical law $P(n)$.

Figure 3:
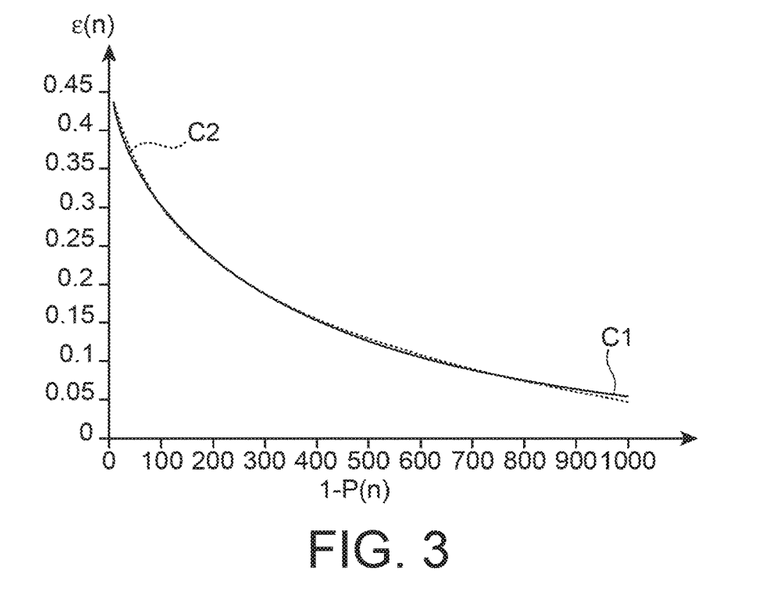
FIG. 3 is a graph representing curves relative to a theoretical reliability law and its approximation function according to the invention.

FIG. 3 is a graph representing the error curves $\varepsilon(n)$ relative to a theoretical reliability law $P(n)$ for the PFA and its corresponding approximation function $f(n)$.

The theoretical curve C1 gives the shape of $\varepsilon(n)=1-P(n)$ for a parameter p=4% and a reliability requirement $\alpha$=5% and the dashed curve C2 represents the approximation $1-f(n)$. The two curves C1 and C2 are almost identical and consequently the complement of the approximation function $f(n)$ can be used to determine the minimum quantity of observation data.

For example, if a precision of 0.9 is required (i.e., an error $\varepsilon(n)=0.1$) with a theoretical Probability of False Alarm equal to p=4% and a requirement of $\alpha$=5%, at least 650 measurements are required as indicated on the graph. In other words, to evaluate a validation for monitoring of equipment on an aircraft engine 5 with a probability of false alarm equal to less than 5% and a probability or assurance of 90%, about 650 observation have to be collected.

Moreover, the precision on the observation data increases with the increase in the number of data.

Figure 4:
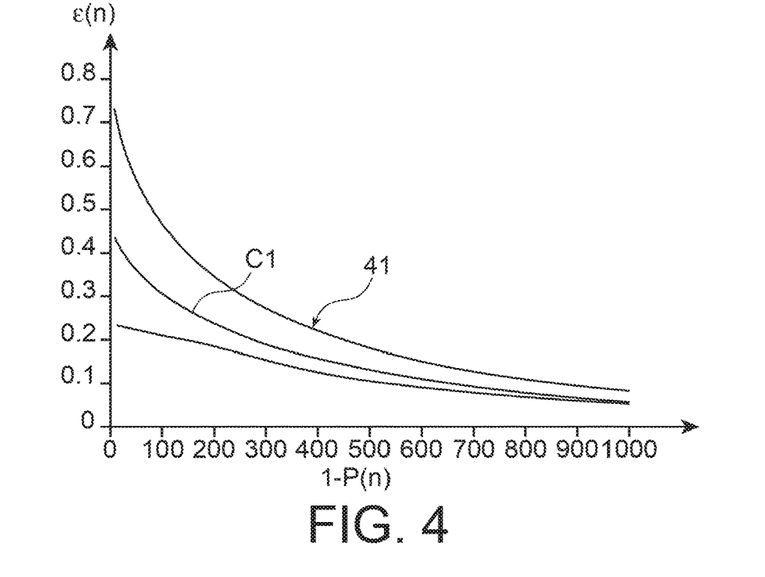
FIG. 4 is a graph representing observation measurements around the curve related to the theoretical reliability law.

FIG. 4 is a graph representing observation measurements around the curve representing the error $\varepsilon(n)$. These measurements form a confidence tube 41 around the curve C1 or C2 showing that the precision then is low at the beginning of the experiments, and the tube then becomes more refined as the number of data increases.

Finally in step E5, the test means 13 apply quality indicators KPI on the minimum number $N_0$ of observation data so as to optimally evaluate the validation of the monitoring system 3.

Figure 5:
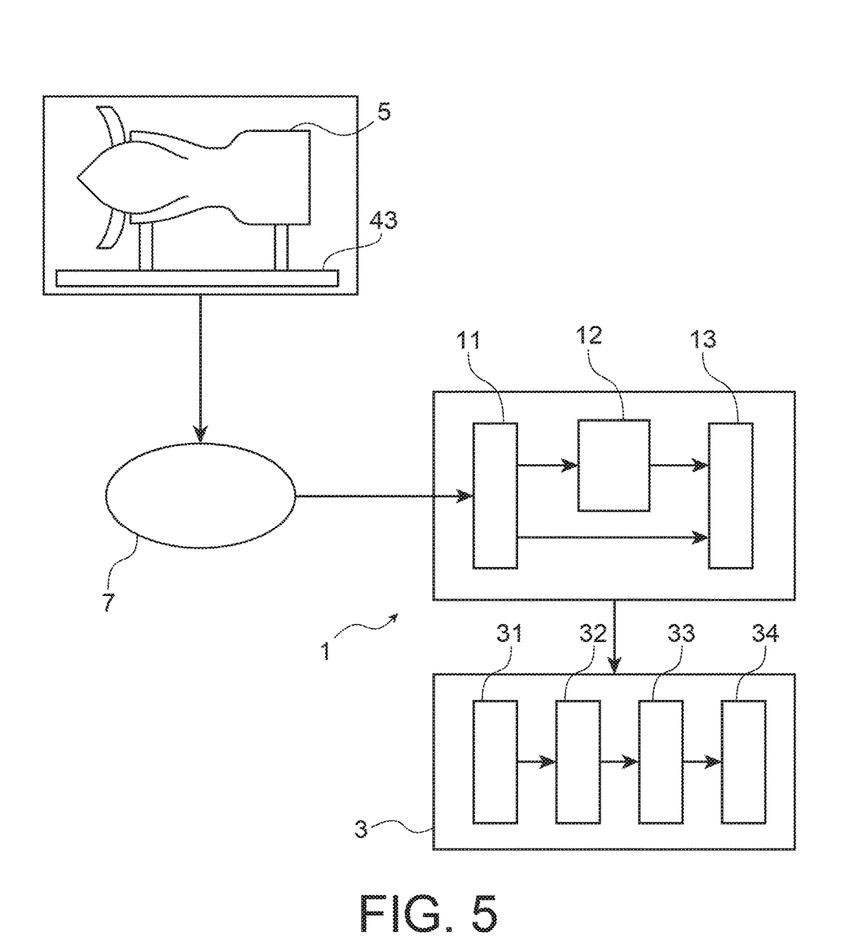
FIG. 5 diagrammatically illustrates a tool for validation of a system for monitoring equipment on an aircraft engine, according to a first preferred embodiment of the invention.

FIG. 5 diagrammatically illustrates a tool for validation of a system for monitoring equipment on an aircraft engine, according to a first preferred embodiment of the invention.

This first embodiment relates to validation of a generic monitoring system 3 on a test bench 43 before its installation on an aircraft.

The specification for the monitoring system 3 is broken down into requirement specifications, themselves expressing requirements and objectives. A response is given to a requirement or an objective when there is a test available to validate the expected performances. This test is applicable to at least part of a set of quality indicators KPI that is compared with thresholds defined by specifications. KPI values are calculated by validation scenarios adapted to problems raised by the requirement or the objective. The scenarios are based on observation data providing reasonable coverage of the need.

Thus, processing means 11 collect observation data 7 for the equipment to be monitored and created on the test bench 43. As a variant, the observation data 7 are collected on aircraft testing the monitoring system 3.

As already described, the analysis means 12 calculate the value of each quality indicator on a current quantity of observation data 7. They then estimate a minimum number of observation data starting from which the value of the quality indicator satisfies a predetermined reliability criterion with a probability higher than a predetermined value. This minimal number of observation data guarantees a sufficient coverage for quality indicators to have a meaning and consequently, to know when tests on the test bench 43 can be terminated.

The test means 13 then evaluate the validation of the monitoring system 3 by applying KPI quality indicators on said minimum number of observation data 7 related to this equipment.

Figure 6:
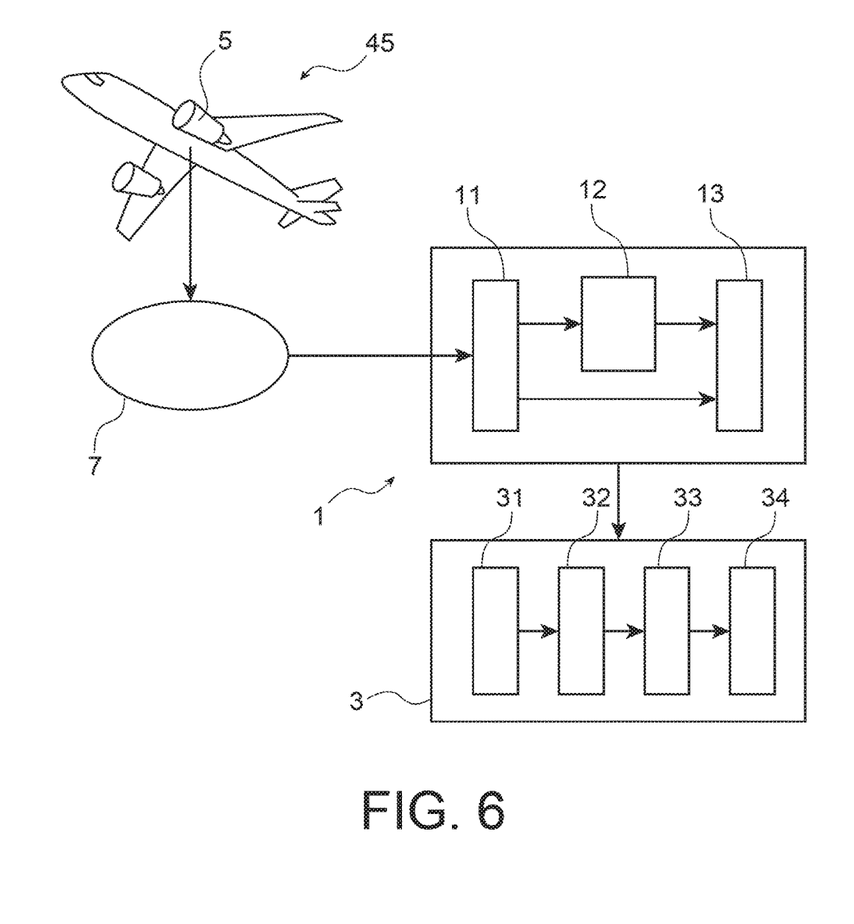
FIG. 6 diagrammatically illustrates a tool for validation of a system for monitoring equipment on an aircraft engine, according to a second preferred embodiment of the invention.

FIG. 6 diagrammatically illustrates a tool for validation of a system for monitoring equipment on an aircraft engine, according to a second preferred embodiment of the invention.

This second embodiment relates to the validation and adjustment of said monitoring system 3 after its installation on a series engine 5 of an aircraft 45 by applying at least part of the set of quality indicators on the minimum quantity of observation data collected in flight.

The monitoring system 3 is already precalibrated on a set of observation measurements made on a test bench 41 according to the first embodiment or on aircraft belonging to airlines who agree to contribute to the development of monitoring systems.

It will be noted that the aircraft 43 on which the monitoring system 3 is installed will follow its own missions, and maintenance operations specific to the owner airline will also be carried out on it. Thus, validation takes account of the specific use of the engine on which it is installed.

As described above, the processing means 12 collect observation data 7 for the equipment to be monitored produced on the engine during operation. The analysis means estimate a minimum number of observation data starting from which the value of a quality indicator reaches a predetermined reliability criterion with a probability higher than a predetermined value. This can be used to determine when the validation test can be stopped, but also when it should be resumed if operations performed by the carrier aircraft change or if the engine configuration changes following maintenance operations.

What is claimed is:

1. Tool for validation of a system (3) for monitoring at least one item of equipment on an aircraft engine (5), comprising test means (13) configured to evaluate a validation of said monitoring system (1) by applying a set of quality indicators to a volume of observation data (7) related to said equipment, characterised in that it comprises:
   processing means (11) configured to collect observation data related to said equipment,
   analysis means (12) configured to calculate a current value of at least one quality indicator on a current quantity of observation data collected by the processing means (11) and by applying a cross-validation technique on said current quantity of observation data,
   analysis means (12) configured to estimate the probability that said current value of the quality indicator reaches a predetermined reliability criterion, thus forming a probabilistic reliability law estimated on a set of values of the quality indicator applicable to a corresponding set of quantities of observation data, and
   analysis means (12) configured to estimate a minimum quantity of observation data from said probabilistic reliability law, starting from which the value of the quality indicator reaches a predetermined reliability criterion with a probability exceeding a predetermined value, said minimum quantity of observation data corresponding to said volume of observation data that will be used to evaluate the validation of said monitoring equipment.

2. Validation tool according to claim 1, characterised in that said predetermined value is the complement of an error predefined as being acceptable.

3. Validation tool according to claim 1, characterised in that said cross validation technique is selected from among the following techniques: bootstrap, K-fold, leave-one-out.

4. Validation tool according to claim 1, characterised in that the set of quality indicators includes the following indicators: false alarm ratio, detection ratio, localisation ratio.

5. Validation tool according to claim 1, characterised in that the analysis means (12) are configured to apply a regression technique on said set of quality indicator values to determine an approximation function representative of said probabilistic reliability law as a function of the quantity of observation data.

6. Validation tool according to claim 5, characterised in that, for a quality indicator corresponding to the probability of false alarm, said approximation function as a function of the quantity n of observation data is expressed by the following relation:

$$f(n) = a + \frac{b}{\sqrt{n}} + c \log(n)$$

in which a, b, c are regression constants.

7. Validation tool according to claim 1, characterised in that the test means are configured to evaluate a validation of said monitoring system before its installation on an aircraft by applying the set of quality indicators on a quantity of observation data collected on a test bench and/or a fleet of aircraft engines in operation.

8. Validation tool according to claim 7, characterised in that the test means (13) are configured to continue validation and adjustment of said monitoring system after its installation on a series engine (5) by applying the set of quality indicators on a quantity of observation data collected in flight.

9. System for monitoring at least one item of equipment on an aircraft engine designed by the design tool according to claim 1, characterised in that it is configured to receive observation data specific to said equipment and to deliver a result containing a diagnostic of the state of said equipment.

10. Method of validating a system for monitoring at least one item of aircraft engine equipment, comprising test steps to evaluate a validation of said monitoring system by applying a set of quality indicators to a volume of observation data related to said equipment, characterised in that it also comprises the following steps:
   collect observation data related to said equipment,
   calculate a current value of at least one quality indicator on a current quantity of observation data collected by the processing means and by applying a cross-validation technique on said current quantity of observation data,
   estimate the probability that said current value of the quality indicator reaches a predetermined reliability criterion, thus forming a probabilistic reliability law estimated on a set of values of the quality indicator applicable to a corresponding set of quantities of observation data, and
   estimate a minimum quantity of observation data from said probabilistic reliability law, starting from which the value of the quality indicator reaches a predetermined reliability criterion with a probability exceeding a predetermined value, said minimum quantity of observation data corresponding to said volume of observation data that will be used to evaluate the validation of said monitoring equipment.

* * * * *